United States Patent [19]

Anzue et al.

[11] Patent Number: 4,986,552
[45] Date of Patent: Jan. 22, 1991

[54] EXCLUDER TYPE SEAL WITH SLIDING FRICTION REDUCING FEATURE

[75] Inventors: Kaoru Anzue, Nihonmatsu; Jun Isomoto; Nobuo Takei, both of Kyoto, all of Japan

[73] Assignees: NOK Corporation; Mitsubishi Jidosha Kogyo Kabushiki Kaisha, both of Japan

[21] Appl. No.: 362,795

[22] Filed: Jun. 7, 1989

[30] Foreign Application Priority Data

Jun. 14, 1988 [JP] Japan ............................. 63-78534[U]

[51] Int. Cl.$^5$ ..................... F16J 15/32; F16J 15/34; F16J 15/40
[52] U.S. Cl. .................................... 277/38; 277/74; 277/95; 277/133; 277/134; 277/152
[58] Field of Search ................. 277/25, 37, 38, 67, 277/70, 71, 74, 75, 81, 85, 95, 133, 134, 152; 384/135, 139, 478, 481, 482, 486, 607, 900

[56] References Cited

U.S. PATENT DOCUMENTS

| | | | |
|---|---|---|---|
| 2,902,300 | 9/1959 | Schultz | 384/478 X |
| 3,070,028 | 12/1962 | Loy et al. | 277/133 |
| 3,510,138 | 5/1970 | Bowen | 384/478 X |
| 3,703,296 | 11/1972 | Malmstrom | 277/25 |
| 4,565,378 | 1/1986 | Wehrfritz et al. | 277/95 X |
| 4,669,895 | 6/1987 | Colanzi et al. | 384/478 X |

Primary Examiner—Allan N. Shoap
Assistant Examiner—Scott Cummings
Attorney, Agent, or Firm—Oliff & Berridge

[57] ABSTRACT

A sealing assembly is adapted to be disposed between a stationary part and a rotary shaft in the stationary part so as to provide a seal in the gap between the stationary part and the rotary shaft. The sealing assembly has a slinger capable of rotating as a unit with the rotary shaft, and a rubber seal having a lip which makes a sliding contact with the slinger. The portion of the slinger contacted by the lip of the rubber seal is provided with apertures which allow a lubricating oil to flow into the region of the sliding contact between the lip of the seal rubber and the portion of the slinger.

13 Claims, 5 Drawing Sheets

EXCLUDER TYPE SEAL WITH SLIDING FRICTION REDUCING FEATURE

BACKGROUND OF THE INVENTION

The present invention relates to a sealing assembly and, more particularly, to a sealing assembly which benefits from reduced wear and which is capable of improving the sealing effect.

A sealing assembly is known which is fixed to a stationary part such that a rotary shaft rotatably extends through the sealing assembly, thereby providing a seal in the gap between the stationary part and the rotary shaft. FIGS. 5 to 7 illustrates the construction of a typical example of the sealing assembly of the kind described.

The sealing assembly shown in these Figures has a slinger 43 composed of a tubular portion 43b through which the rotary shaft 41 extends and a radial portion 43a provided on one axial end of the tubular portion 43b and extending radially outwardly therefrom, and a rubber seal 45 which is disposed on the outer side of the tubular portion 43b of the slinger 43. The rubber seal 45 has a reinforcement member 44 embedded therein. The reinforcement member has a substantially L-shaped cross-section with one leg 44a thereof being directed towards the slinger 43.

The rubber seal 45 has outer peripheral surface fitting in the bore in the stationary part 42, and is provided, at its portion adjacent the slinger 43, with a lip 45a contacting the radial portion 43a of the slinger 43 and a lip 45b which is directed towards the tubular portion 43b on the rotary shaft 41.

In order to impart a high oil-gathering effect produced by the lips 45a and 45b, a spiral groove 46 starting at the center and terminating at the peripheral end is formed in the surface of the radial portion 43a of the slinger 43 facing the lip 45a.

In operation, the slinger 43 rotates together with the rotary shaft 41 as a unit therewith, with the lip 45a of the rubber seal 45 kept in sliding contact with the radial portion 43a of the slinger 43 thereby attaining a sealing effect.

This known sealing assembly, however, suffers from the following disadvantages.

In operation, the spiral groove 46 formed in the radial portion 43a of the slinger 43 serves to displace the oil radially outwardly during rotation of the slinger 43 as shown in FIG. 7, with the result that the lubricating condition on the sliding surface of the lip 45a is impaired to adversely affect sealing assembly durability. In addition, since the pressure at which the lip 45a contacts with the slinger 43 is kept constant regardless of the rotation speed 41 of the rotary shaft 41, the resistance torque is undesirably increased as the rotation speed increases.

SUMMARY OF THE INVENTION

Accordingly, an object of the present invention is to provide a sealing assembly in which the sliding frictional resistance between the lip and the slinger is reduced to suppress the wear of the lip.

Another object of the present invention is to provide a sealing assembly which is improved to prevent resistance torque from increasing when the rotation speed is increased.

To this end, according to the present invention, there is provided a sealing assembly which is adapted to be disposed between a stationary part and a rotary shaft in the stationary part so as to provide a seal in the gap between the stationary part and the rotary shaft, the sealing assembly comprising a slinger rotatable as a unit with the rotary shaft and a rubber seal secured to the stationary part and provided with a lip which makes a resilient pressure contact with the slinger, wherein the portion of the slinger contacted by the lip of the rubber seal is provided with apertures through which lubricating oil is supplied to the region of the sliding contact between the lip and the slinger, thereby suppressing wear of the lip. The lubricating oil supplied through the apertures lubricates the sliding surfaces so that undesirable increases in the resistance torque due to increases in the rotation speed is suppressed.

These and other objects, features and advantages of the following description of the preferred embodiments when the same is read in conjunction with the accompanying drawings.

DESCRIPTION OF THE PREFERRED EMBODIMENTS

Figure 1:
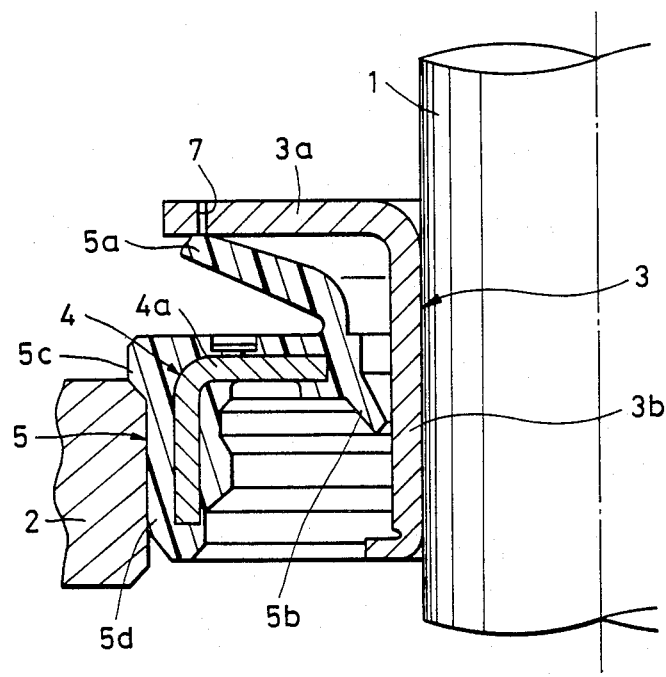
FIG. 1 is a sectional view of a first embodiment of the sealing assembly in accordance with the present invention, taken at a plane which includes the axis of a rotary shaft on which the sealing assembly is set.
Figure 2:
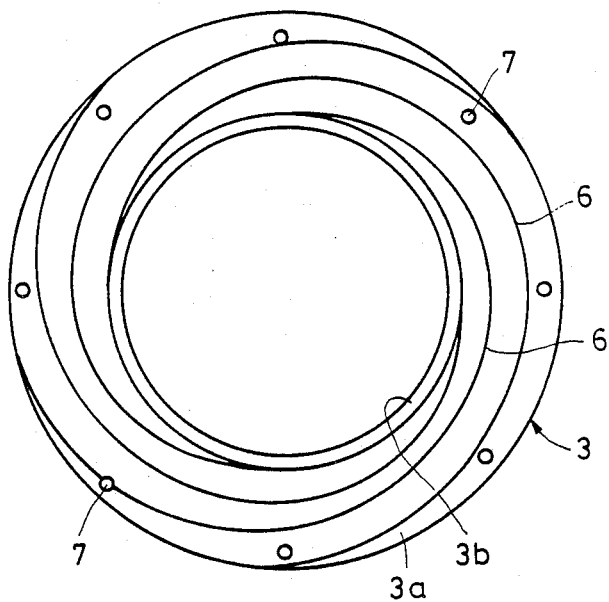
FIG. 2 is a bottom plan view of a slinger incorporated in the sealing assembly of FIG. 1.
Figure 3:
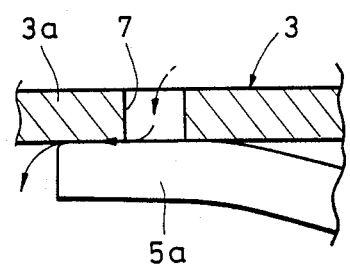
FIG. 3 is a sectional view of an essential portion of the sealing assembly, showing particularly the relationship between the rubber seal and the lip.

FIGS. 1 to 3 show a first embodiment of the sealing assembly in accordance with the present invention.

The sealing assembly is composed of a slinger 3 and a rubber seal 5.

The slinger 3 has a tubular portion 3b through which a rotary shaft 1 extends, and a radial portion 3a provided on one end of the tubular portion 3b and extending radially outwardly therefrom.

The rubber seal 5, which is secured to a stationary portion 2, is provided with a reinforcement member 4 embedded therein. The reinforcement member 4 has a substantially L-shaped cross-section with its one leg 4a directed towards the tubular member 14 of the slinger 3. The rubber seal 5 surrounds the tubular portion 3b of the slinger 3.

The rubber seal 5 has a stepped outer peripheral surface the reduced-diameter portion 5d of which fits in the stationary part 2. The rubber seal 5 is provided at its portion adjacent to the slinger 3 with a lip 5a which resiliently contacts with radial portion 3a of the slinger 3 and also with a lip 5b which is directed towards the tubular portion 3a of the slinger 3.

The surface of the radial portion 3a of the slinger 3 facing the lip 5a is provided with a spiral groove 6 which starts at the inner peripheral end and terminates in the outer peripheral end of the radial portion 3a. A plurality of apertures 7 are formed in an annular region of the radial portion 3a contacted by the lip 5a.

In operation, the rotation of the rotary shaft 1 causes lubricating oil to be displaced radially outwardly in the sliding region between the lip 5a of the rubber seal 5 and the radial portion 3a of the slinger 3, by the effect of the spiral groove 6 formed in the radial portion 3a of the slinger 3. However, in the sealing assembly of the present invention, new lubricating oil is supplied into the sliding region through the apertures 7 formed in the radial portion 3a of the slinger 3, as illustrated in FIG. 3.

Thus, according to the invention, a new portion of lubricating oil is supplied through the apertures 7 7 so as to compensate for radially outward displacement of the oil caused by the action of the groove 6 formed in the slinger, so that a good lubricating condition is maintained in the region of the sliding contact between the radial portion 3a of the slinger 3 and the lip 5a, whereby the wear-resistance characteristics of the sealing assembly is remarkably improved.

This good lubricating condition obtained in the region of the sliding contact between the lip 5a of the rubber seal 5 and the radial position 3a of the slinger 3 effectively suppresses substantial increases in the resistance torque even when the rotary shaft rotates at a high speed. In addition, since only the reduced-diameter portion 5d of the rubber seal 5 fits in the stationary part 2 while the large-diameter portion 5c contacts with a side surface of the stationary part 2, the rubber seal 5 is prevented from moving axially even when a force is generated in the axial direction of the rotary shaft 1, thus preventing undesirable axial shift of the sealing assembly.

The provision of the step on the outer peripheral surface of the rubber seal 5 is not essential. Namely, the rubber seal 5 may have a straight outer peripheral surface, i.e., only the reduced-diameter portion 5d which fits in the stationary part 2.

Figure 4:
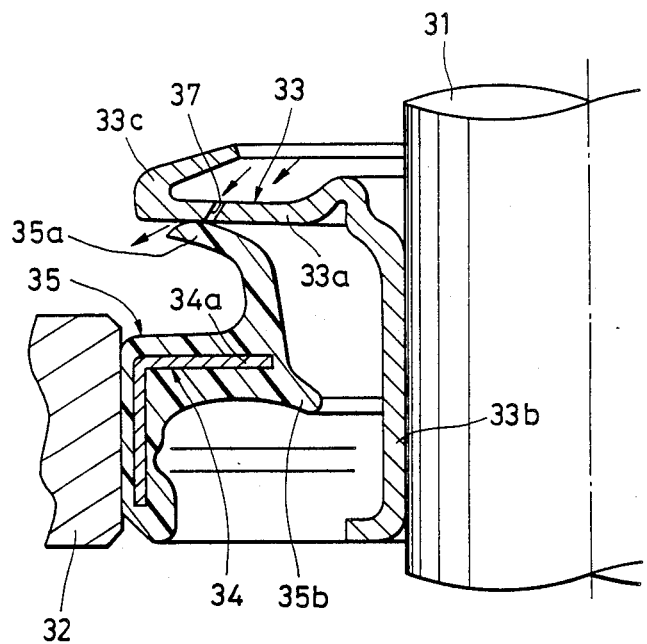
FIG. 4 is a longitudinal sectional view of another embodiment of the sealing device in accordance with the present invention.
Figure 5:
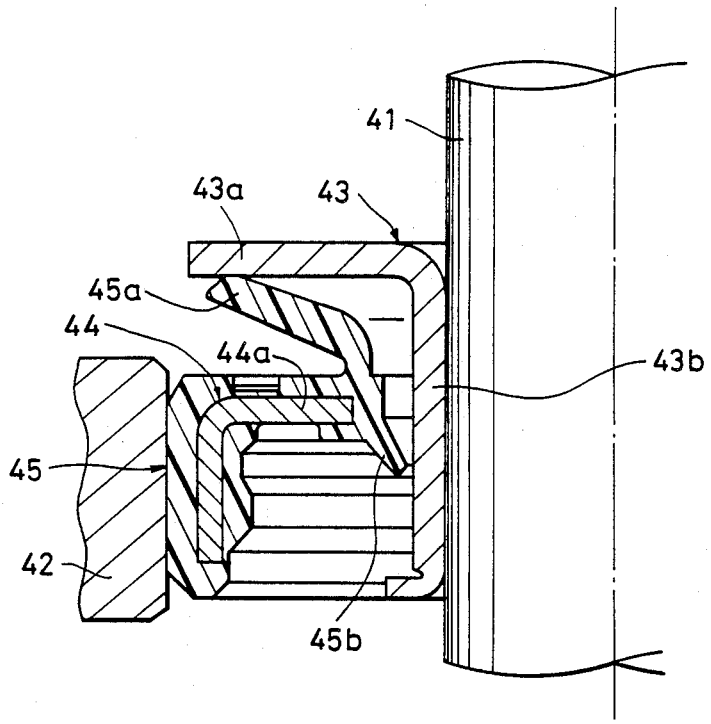
FIG. 5 is a sectional view of a known sealing assembly.
Figure 6:
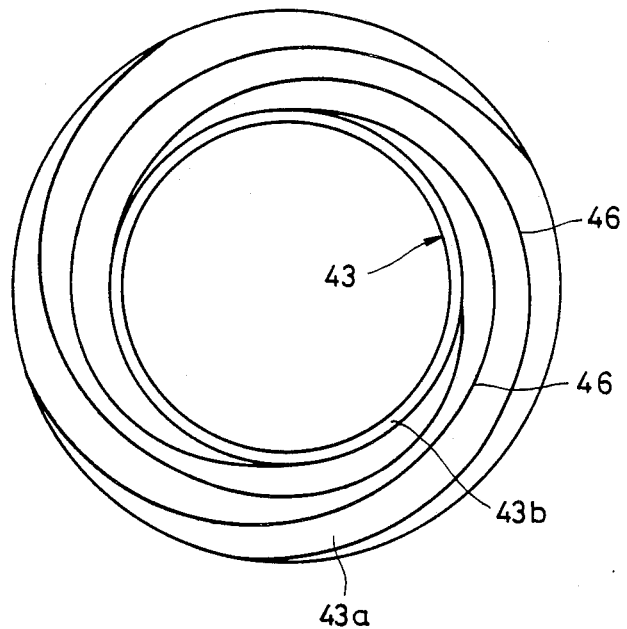
FIG. 6 is an end view of a slinger incorporated in the sealing assembly of FIG. 5.
Figure 7:
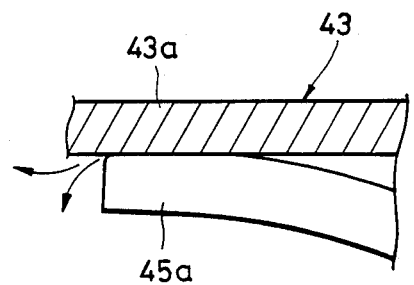
FIG. 7 is an illustration of the relationship between the slinger and the rubber seal lip in the sealing assembly of FIG. 5.

FIG. 4 shows another embodiment of the sealing assembly in accordance with the present invention.

This embodiment has a slinger 33 and a rubber seal 35. The slinger 33 has a tubular portion 33b through which the rotary shaft 31 extends, a radial portion 33a provided on one end of the tubular portion 33b and extending radially outwardly therefrom, and a tab portion 33c inwardly bent from the radially outer end of the radial portion 33a.

The rubber seal 32, which is secured to a stationary part 32, has a reinforcement member 34 embedded therein and having an L=shaped cross-section, or leg of which is directed towards the slinger 33. The rubber seal 35 is disposed so as to surround the tubular portion 33b of the slinger 33.

The rubber seal 35 is provided at its portion adjacent to the slinger 33 with a lip 35a contacting with the radial portion 33a of the slinger 33 and a lip 35b which is directed towards the tubular portion 33b of the slinger 33.

Furthermore, as in the case of the preceding embodiment, the surface of the radial portion 33a of the slinger 33 facing the lip 35a of the rubber seal 35 is provided with a spiral groove which starts at the inner peripheral end and terminates in the outer peripheral end of the radial portion 33a and a plurality of apertures 37 are formed in the annular region of the radial portion 33a which contacts with the lip 35a.

In operation of this sealing assembly, rotation of the rotary shaft 31 causes lubricating oil to be displaced radially outwardly along the radial portion 33a of the slinger 33. In order to compensate for the radially outward displacement of the lubricating oil, a new portion of the lubricating oil is supplied to the sliding contact region between the lip 35a of the rubber seal 35 and the radial portion 33a of the slinger 33.

In this embodiment, lubricating oil is accumulated in an annular recess which is formed by the radial portion 33a and the tab portion 33c which is folded back from the radial outer end extremity of the radial portion 33a. This oil is caused to flow through the apertures 37 as indicated by arrows so as to come into the region of the sliding contact between the lip 35a of the seal rubber 35 and the radial portion 33a of the slinger 33. By virtue of the continuous supply of the lubricating oil, a good lubricating condition is maintained in the region of the sliding contact between the lip 35a of the seal rubber 35 and the radial portion 33a of the slinger 33, so that the wear resistance can be remarkably improved. This good lubricating condition also suppresses any undesirable increase in the resistance torque which may otherwise be increased considerably when the speed of rotation of the rotary shaft 32 is increased.

The rubber seal 35 may have a stepped outer peripheral surface such that only a reduced-diameter portion fits in the bore formed in the stationary part while a large-diameter portion rests on one side of the stationary member, so that any risk for the sealing assembly to undesirably move axially is prevented.

What is claimed is:

1. A sealing assembly which is to be provided between a stationary part and a rotary shaft which extends through said stationary part, so as to form a seal in a gap between said stationary part and said rotary shaft to prevent the ingress of a fluid, said sealing assembly comprising: a slinger capable of rotating as a unit with said rotary shaft; and a rubber seal having a lip which makes a sliding contact with said slinger; wherein the portion of said slinger contacted by said lip of said rubber seal is provided with apertures which allow a lubricating flow of said fluid into the region of the sliding contact between said lip of said rubber seal and said portion of said slinger.

2. A sealing assembly according to claim 1, wherein said slinger includes a tubular portion fitting on said rotary shaft so as to be secured to said rotary shaft.

3. A sealing assembly according to claim 1, wherein said slinger has a radial portion extending radially outwardly in the direction perpendicular to the axis of said rotary shaft and said lip portion of said rubber seal makes sliding contact with said radial portion.

4. A sealing assembly according to claim 1, wherein the surface of said radial portion contacted by said lip of said rubber seal is provided with a spiral groove.

5. A sealing assembly which is to be provided between a stationary part and a rotary shaft which extends through said stationary part, so as to form a seal in a gap between said stationary part and said rotary shaft to prevent the ingress of a fluid, said sealing assembly comprising: a slinger capable of rotating as a unit with said rotary shaft and having a radial portion extending radially outwardly in a direction perpendicular to the axis of said rotary shaft; and a rubber seal having a lip which makes a sliding contact with said radial portion of said slinger; wherein said radial portion of said slinger contacted by said lip of said rubber seal, is provided with apertures which allow a lubricating flow of said fluid into the region of the sliding contact between said lip of said rubber seal and said portion of said slinger.

6. A sealing assembly according to claim 5, wherein said slinger includes a tubular portion fitting on said rotary shaft so as to be secured to said rotary shaft.

7. A sealing assembly according to claim 5, wherein the surface of said radial portion contacted by said lip of said rubber seal is provided with a spiral groove.

8. A sealing assembly according to claim 5, wherein said rubber seal has a stepped outer peripheral portion with a reduced-diameter portion thereof fitting in said stationary part.

9. A sealing assembly which is to be provided between a stationary part and a rotary shaft which extends through said stationary part, so as to form a seal in a gap between said stationary part and said rotary shaft to prevent the ingress of a fluid, said sealing assembly comprising: a slinger rotatable as a unit with said rotary shaft and including a radial portion which extends radially outwardly in a direction perpendicular to the axis of said rotary shaft and a tab portion bent back from a radially outer end extremity of said radial portion; and a rubber seal secured to said stationary part and making sliding contact with said radial portion of said slinger said radial portion of said slinger slidingly contacted by said lip of said rubber seal being provided with apertures which allow a lubricating flow of said fluid into the region of the sliding contact between said lip of said rubber seal and said radial portion of said slinger.

10. A sealing assembly according to claim 9, wherein said slinger includes a tubular portion fitting on said rotary shaft so as to be secured to said rotary shaft.

11. A sealing assembly according to claim 9, wherein the surface of said radial portion contacted by said lip of said rubber seal is provided with a spiral groove.

12. A sealing assembly according to claim 9, wherein said rubber seal has a stepped outer peripheral portion with a reduced-diameter portion thereof fitting in said stationary part.

13. The sealing assembly of claim 1 wherein said apertures define passageways adapted to provide radially outwardly extending flow of said fluid to said region of sliding contact.

* * * * *